(12) United States Patent
Liu

(10) Patent No.: US 6,560,449 B1
(45) Date of Patent: May 6, 2003

(54) IMAGE-REJECTION I/Q DEMODULATORS

(75) Inventor: Bin Liu, Danville, CA (US)

(73) Assignee: Broadcom Corporation, Irvine, CA (US)

( * ) Notice: Subject to any disclaimer, the term of this patent is extended or adjusted under 35 U.S.C. 154(b) by 238 days.

(21) Appl. No.: 09/591,925

(22) Filed: Jun. 12, 2000

(51) Int. Cl.$^7$ ................................................ H04B 1/10
(52) U.S. Cl. ........................................ 455/302; 455/205
(58) Field of Search ................................ 455/302, 304, 455/308, 309, 310, 312, 326, 334, 337, 147, 205, 208, 210

(56) References Cited

U.S. PATENT DOCUMENTS 5,784,402 A * 7/1998 Feber .......................... 375/200
5,983,082 A * 11/1999 Hibert .......................... 455/76
6,016,422 A * 1/2000 Bartusiak ..................... 455/76

* cited by examiner

Primary Examiner—Daniel Hunter
Assistant Examiner—Thuan T. Nguyen
(74) Attorney, Agent, or Firm—Christie, Parker & Hale, LLP

(57) ABSTRACT

In a communications receiver for quadrature demodulation, a feedback technique for reducing the image response of the receiver. The communications receiver includes an I demodulator and a Q demodulator. A local oscillator (LO) signal is provided by a PLL to a quadrature LO generator that provides an LO_I signal to an I demodulator and an LO_Q signal to a Q demodulator. The LO_I and LO_Q signals are amplitude and phase-controlled versions of the LO signal. An image/signal ratio (I/S) detector detects the relative phase difference and the relative amplitude difference between the respective output terminals of the I demodulator and the Q demodulator and applies an amplitude control signal and a phase control signal to corresponding amplitude control and phase control inputs of the quadrature LO generator. The I/S detector calibrates the quadrature LO generator during the interstitial interval between the reception of data packets. The control signals from the I/S detector adjust the relative amplitude and phase of the LO_I and LO_Q signals in a manner that reduces the image response of the communications receiver.

36 Claims, 5 Drawing Sheets

IMAGE-REJECTION I/Q DEMODULATORS

INCORPORATION BY REFERENCE

This application, by this reference, hereby incorporates the following U.S. patent applications, in their entirety, all filed on Jun. 12, 2000:

"Receiver Architecture Employing Low Intermediate Frequency And Complex Filtering", to Albert Liu, Ser. No. 09/592,016;

"Wireless Data Communications Using FIFO For Synchronization Memory", to Sherman Lee, Vivian Y. Chou, and John H. Lin, Ser. No. 09/593,583;

"Context Switch Architecture And System", to Sherman Lee, Vivian Y. Chou, and John H. Lin, Ser. No. 09/592,009; and "Dynamic Field Patchable Microarchitecture", to Sherman Lee, Vivian Y. Chou, and John H. Lin, Ser. No. 09/672,064.

FIELD OF THE INVENTION

The invention relates to digital communications systems and, more particularly, to a technique for the reduction in the image response characteristics of an integrated circuit receiver that incorporates I/Q demodulation.

BACKGROUND OF THE INVENTION

I/Q (In-phase/Quadrature) modulators and demodulators are widely used in digital communications systems. I/Q demodulators are abundantly discussed in the technical literature. See, for example, Behzad Razavi, *RF Microelectronics,* Prentice Hall (1998) and John G. Proakis, *Digital Communications,* McGraw-Hill (1995). There exists also patent art related to the technology of I/Q modulation and demodulation: U.S. Pat. No. 5,974,306, entitled "Time-Share I/Q Mixer System With Distribution Switch Feeding In-Phase and Quadrature Polarity Inverters" to Hornak, et al.; U.S. Pat. No. 5,469,126, entitled "I/Q Modulator and I/Q Demodulator" to Murtojarvi.

Examples of system applications that incorporate and standardize I/Q modulation and demodulation include the GSM (Global System for Mobile Communications), IS-136 (TDMA), IS-95 (CDMA), and IEEE 802.11 (wireless LAN). I/Q modulation and demodulation have also been proposed for use in the Bluetooth wireless communication systems.

Bluetooth is a low-power radio technology being developed with a view to substituting a radio link for wire and cable that now connect electronic devices, such as personal computers, printers and a wide variety of handheld devices, including palm-top computers, and mobile telephones. The development of Bluetooth began in early 1998 and has been promoted by a number of telecommunications and computer industry leaders. The Bluetooth specification is intended to be open and royalty-free and is available to potential participants as a guide to the development of compatible products.

The Bluetooth system operates in the 2.4 GHz ISM (Industrial, Scientific, Medical) band, and devices equipped with Bluetooth technology are expected to be capable of exchanging data at speeds up to 720 Kbs at ranges up to 10 meters. This performance is achieved using a transmission power of 1 mw and the incorporation of frequency hopping to avoid interference. In the event that a Bluetooth-compatible receiving device detects a transmitting device within 10 meters, the receiving device will automatically modify its transmitting power to accommodate the range. The receiving device is also required to operate in a low-power mode as traffic volume becomes low, or ceases altogether.

Bluetooth devices are capable of interlinking to form piconets, each of which may have up to 256 units, with one master and seven slaves active while others idle in a standby mode. Piconets can overlap, and slaves can be shared. In addition, a form of scatternet may be established with overlapping piconets, thereby allowing data to migrate across the networks.

An example of a Bluetooth-compliant digital communications receiver that incorporates an I/Q demodulator is depicted in FIG. 1. As may be seen from FIG. 1, the receiver includes an antenna 10 that intercepts a transmitted RF signal. The signal received by antenna 10 is filtered in a RF bandpass filter (BPF) 11. BPF 11 may be fixed-tuned or tunable and will have a nominal center frequency at the anticipated RF carrier frequency. The bandwidth of BPF will be designed as appropriate to the overall receiver system design requirements and constraints. One salient purpose of BPF 11 is to effect rejection of out-of-band RF signals, that is, rejection of signals at frequencies other than the frequency of the desired RF carrier. Front-end selectivity is an important factor in minimizing the receiver's susceptibility to intermodulation and cross-modulation interference. In addition, and contextually more relevant, BPF 11 selectivity contributes to the image-rejection characteristics of the receiver.

In general, image rejection refers to the ability of the receiver to reject responses resulting from RF signals at a frequency offset from the desired RF carrier frequency by an amount equal to twice the intermediate frequency (IF) of a dual-conversion receiver. For example, if the desired RF signal is at 100 MHz, and the receiver IF is 10.7 MHz, than the receiver local oscillator (LO) will be tuned to 89.3 MHz. However, as is well known to those skilled in the art, the receiver will also exhibit a response to undesired RF signals at frequency 10.7 MHz below the LO frequency, that is 78.6 MHz. The receiver's response to the 78.6 MHz signal is referred to as the image response, because the image signal resides at a frequency opposite the LO frequency as the desired RF carrier, and offset from the LO frequency by the magnitude of the IF.

Referring still to FIG. 1, the output of BPF 11 is coupled to the input of a low-noise amplifier (LNA) 12. LNA 12 is designed to raise the level of the input RF signal sufficiently to effectively drive the receiver's mixer circuitry. In addition, LNA 12 largely determines the receiver's noise figure.

The output of LNA 12 is coupled to the receiver's mixer/demodulator functional block. The mixer/demodulator includes a quadrature demodulator, including I demodulator 13 and Q demodulator 14. As is commonplace in contemporary receiver design, the receiver incorporates a digital, frequency-synthesized LO function, performed by a voltage-controlled oscillator (VCO) 15, driven by a phase-locked loop (PLL) 16. For a comprehensive exposition of digital frequency-synthesis techniques, see William F. Egan, *Frequency Synthesis by Phase Lock,* John Wiley & Sons, Inc., (2000). The LO signal is coupled to an input of phase-shifter 17. In a manner well understood by artisans, phase-shifter 17 delivers an in-phase version of the LO, LO_I signal 13a, to I demodulator 13 and a quadrature (90° phase shifted) version of the LO, LO_Q signal 14a, to Q demodulator 14. The respective demodulated outputs of demodulators 13 and 14 constitute, respectively, the demodulated I and Q signals.

An ideal I/Q demodulation receiver, as described above, is theoretically capable of infinite image rejection. However, the theoretical assumption is predicated on perfectly matched I and Q channels. Because state-of-the art semiconductor device design and fabrication does not admit of perfect matching between devices, even devices on the same die, some degree of mismatch between the I and Q channels is inevitable. In fact, the mismatch between devices on a semiconductor wafer is known to be dependent on the physical size of the devices. This dependency may be predicted by the following relationships that quantify the standard deviation in threshold voltage $\sigma_{Vt}$, and $\beta, \sigma_\beta$, for a MOS device:

$$\sigma_{Vt} = \frac{30 \text{ (millivolt - micrometer)}}{\sqrt{W \times L}} \quad \text{and}$$

$$\sigma_\beta = \frac{0.09 \text{ (micrometer)}}{\sqrt{W \times L}}, \quad \text{where}$$

W×L is total area occupied by the device on the semiconductor die.

As is immediately apparent from the above, deviations in critical CMOS device parameters vary inversely with to the area occupied by the device. Because lower frequencies of operation permit larger device geometries, mismatch in a receiver IF section tends to be ameliorated as the IF is reduced.

It has been empirically determined that contemporary semiconductor fabrication processes result in I channel and Q channel matching that limits image rejection to approximately 30 to 35 db. In systems implemented with CMOS technology, virtually mandatory when power consumption is a paramount design consideration, not even this level of performance is realizable. This detriment derives from the fact that CMOS devices tend to demonstrate less favorable matching characteristics. Given that a 35 db image rejection specification is considered marginal for most digital communication receiver applications, the problems confronted in a CMOS-based design are glaringly apparent.

Accordingly, what is desired is a solution that enhances the image-rejection performance of digital communication receivers that are implemented with integrated circuit technology. Although the solution is not limited in applicability of designs implemented in CMOS technology, the invention is particularly advantageous in that context.

SUMMARY OF THE INVENTION

The above and other objects, advantages and capabilities are achieved in one aspect of the invention by a communications receiver that comprises a carrier signal source; a first demodulator having a first input coupled to an output of the carrier signal source; a second demodulator having a first input coupled to an out put of the carrier signal source; a local oscillator (LO) signal source; a quadrature phase shifter having an LO input coupled to the LO signal source, an in-phase (I) output coupled to a second input of the first demodulator, and quadrature (Q) output coupled to a second input of the second demodulator; and an image/signal ratio detector having a first input coupled to an output of the first demodulator, a second input coupled to an output of the second demodulator, and an output coupled to the quadrature phase shifter for adjusting the I output of phase shifter and the Q output of phase shifter so as to adjust the image response of the communications receiver.

Another aspect of the invention is apparent in a feedback loop for controlling the image response of a communications receiver that, typically, includes a carrier signal source, a local oscillator (LO) signal source, an in-phase (I) demodulator and a quadrature (Q) demodulator. The feedback loop comprises a quadrature LO generator for providing an LO_I signal to the I demodulator and an LO_Q signal to the Q demodulator, wherein the LO_I and LO_Q signals are amplitude-controlled and phase-controlled versions of the LO signal provided by the LO signal source. The feedback loop also comprises an image/signal ratio (I/S) detector for detecting the amplitude difference and the phase difference between the respective outputs of the I demodulator and the Q demodulator and for adjusting the respective relative amplitudes and phases of the LO_I and LO_Q signals in response to the detected amplitude difference and phase difference.

The invention may also be practiced as a method for adjusting the image response of a communications receiver that includes in-phase (I) and quadrature (Q) demodulators. The method comprises the acts: synthesizing an LO signal; deriving an LO_I signal from the LO signal; deriving an LO_Q signal from the LO signal; detecting an amplitude control signal that results from an amplitude mismatch between an I channel and a Q channel of the communications receiver; detecting a phase control signal that results from a phase mismatch between the I channel and the Q channel; adjusting the relative amplitudes of the LO_I and the LO_Q signals in response to the amplitude control signal; and adjusting the relative phases of the LO_I and the LO_Q signals in response to the phase control signal, wherein the adjustments to the relative respective amplitudes and the relative respective phases of the LO_I and $LO_{13}$ Q signals operate to compensate for mismatch between the I channel and the Q channel in a manner that reduces the image response of the receiver.

The invention is additionally embodied in a mixer for a communications receiver. The mixer comprises an I demodulation channel including an I demodulator; a Q demodulation channel including a Q demodulator; a quadrature LO generator for coupling to a source of LO signals, the quadrature LO generator for developing an $LO_{13}$ I signal coupled to the I demodulator and an LO_Q signal coupled to the Q demodulator, wherein the LO_I and $LO_{13}$ Q signals are adjusted in amplitude and phase in response to mismatch between the I and Q channels, wherein the quadrature LO generator comprises: a polyphase filter having an input for coupling to the source of LO signals, and having an LO_I output and an LO_Q output; an LO_I buffer having an LO_I input coupled to the LO_I output of the polyphase filter and having an LO_I output coupled to the I demodulator; and an LO_Q buffer having an LO_Q input coupled to the LO_Q output of the polyphase filter and having an LO_Q output coupled to the Q demodulator; and an I/S detector for synthesizing an amplitude control signal and a phase control signal in response to mismatch between the I and the Q channels, the I/S detector having (i) inputs coupled to outputs of the I and the Q demodulators, (ii) an output for applying an amplitude control signal to an amplitude control input of the quadrature LO generator, and (iii) an output for applying an phase control signal to a phase control input of the quadrature LO generator, the I/S detector comprising: a rotator having inputs coupled to the outputs of the I and the Q demodulators and having first and second I and Q outputs; an amplitude meter coupled to the first I and Q output of the rotator for developing the amplitude control signal; and a phase meter coupled to the second I and Q output of the rotator for developing the phase control signal.

The invention may also be perceived as a method for calibrating a communications receiver that includes (i) an I demodulation channel including an I demodulator, (ii) a Q demodulator channel including a Q demodulator, and (iii) a quadrature LO generator having an input coupled to a source of LO signals and that provides an LO_I signal to the I demodulator and an LO_Q signal to the Q demodulator. The calibration method comprises the acts: (a) during an interval during which no information is received by the communications receiver, applying an RF test tone to the inputs of the I demodulation channel and the Q demodulation channel; (b) time multiplexing a first LO signal and a second LO signal to the input of the quadrature LO generator so as to simulate the appearance of both a desired RF signal and an image signal at the input of the communications receiver; (c) detecting a signal, $V_{S,IM}$, resulting from the response of the communications receiver to the simulated image signal; (d) extracting from $V_{S,IM}$ an amplitude control signal is proportional to the amplitude mismatch between the I and the Q channels and a phase control signal that is proportional to the phase mismatch between the I and the Q channels; and (e) adjusting the relative amplitudes of the LO_I and the LO_Q signals in response to the amplitude control signal and adjusting the relative phases of the LO_I and the LO_Q signals in response to the phase control signal wherein the adjustments to the relative respective amplitudes and the relative respective phases of the LO_I and LO_Q signals operate to reduce the image response of the receiver.

BRIEF DESCRIPTION OF THE DRAWINGS

The subject invention may be better understood, and its numerous objects, features and advantages made apparent to those skilled in the art, with reference to the following Drawings, wherein.

DETAILED DESCRIPTION

For a thorough understanding of the subject invention, reference is made to the following Description, including the appended Claims, in conjunction with the above described Drawings.

Figure 1:
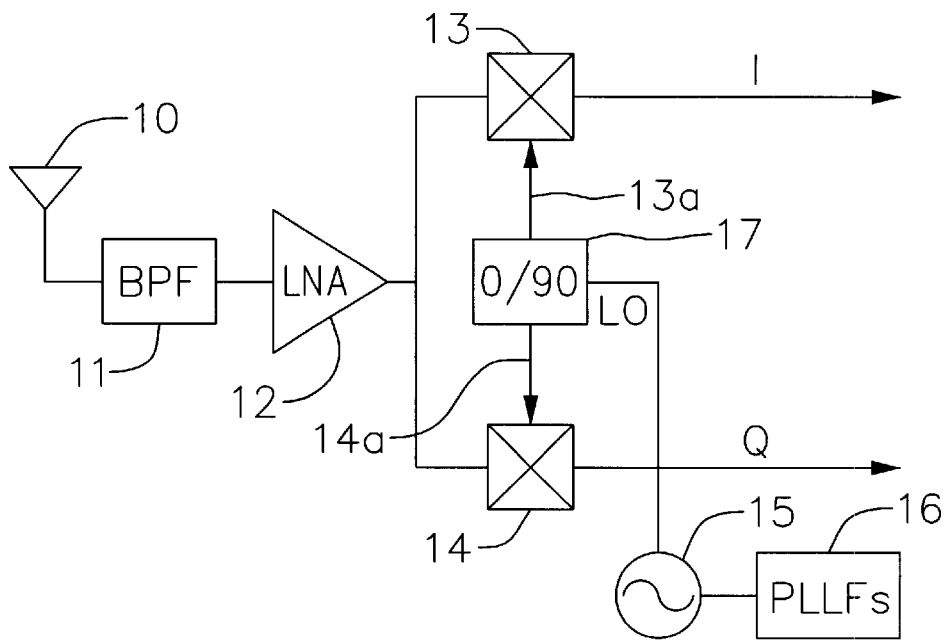
FIG. 1 is a system block diagram of a conventional digital communications receiver predicated on I/Q demodulation.
Figure 2:
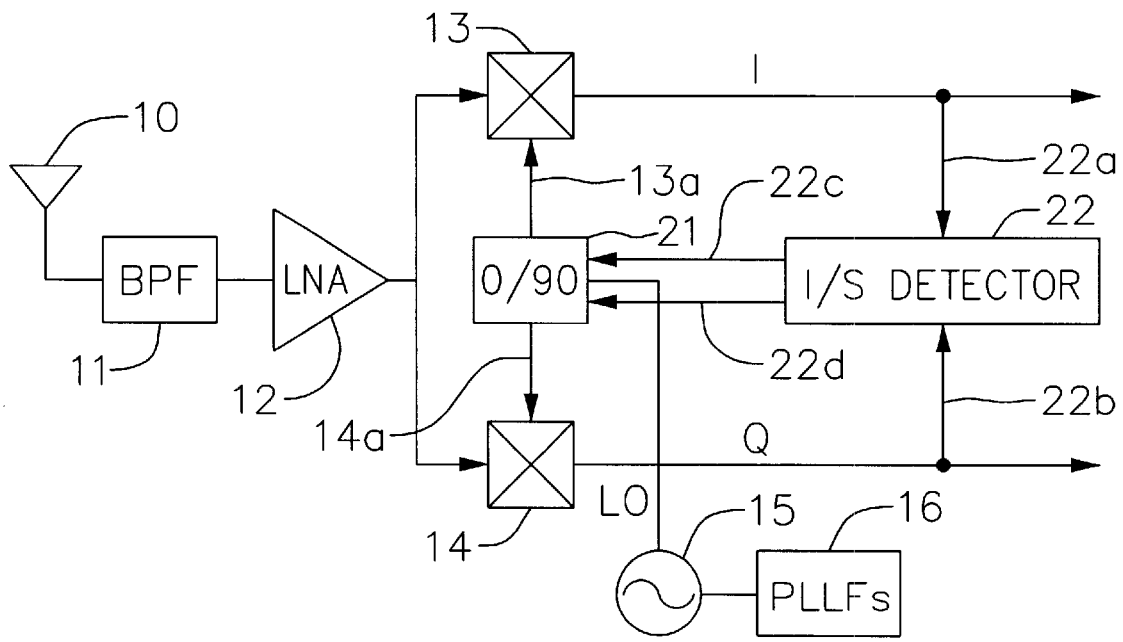
FIG. 2 is a system block diagram of an I/Q demodulation receiver that incorporates aspects of the subject invention, including a quadrature LO generator, with amplitude and phase control provided by an I/S detector.

Referring now to FIG. 2, the subject receiver with image-rejection digital I/Q demodulator is seen to be in many respects similar to the digital I/Q demodulation receiver depicted in FIG. 1. A salient departure is the substitution of the phase shifter 17 in FIG. 1 with the quadrature LO generator 21 in the receiver of FIG. 2. In addition, and in a manner to be more completely described below, the operation of quadrature LO generator 21 is controlled by an image/signal ratio (I/S) detector 22 that applies amplitude control and phase control signals to quadrature LO generator 21 in a manner that adjusts the LO_I and LO_Q signals to the I demodulator 13 and to the Q demodulator 14 respectively, so as to reduce the image response of the receiver.

Figure 3:
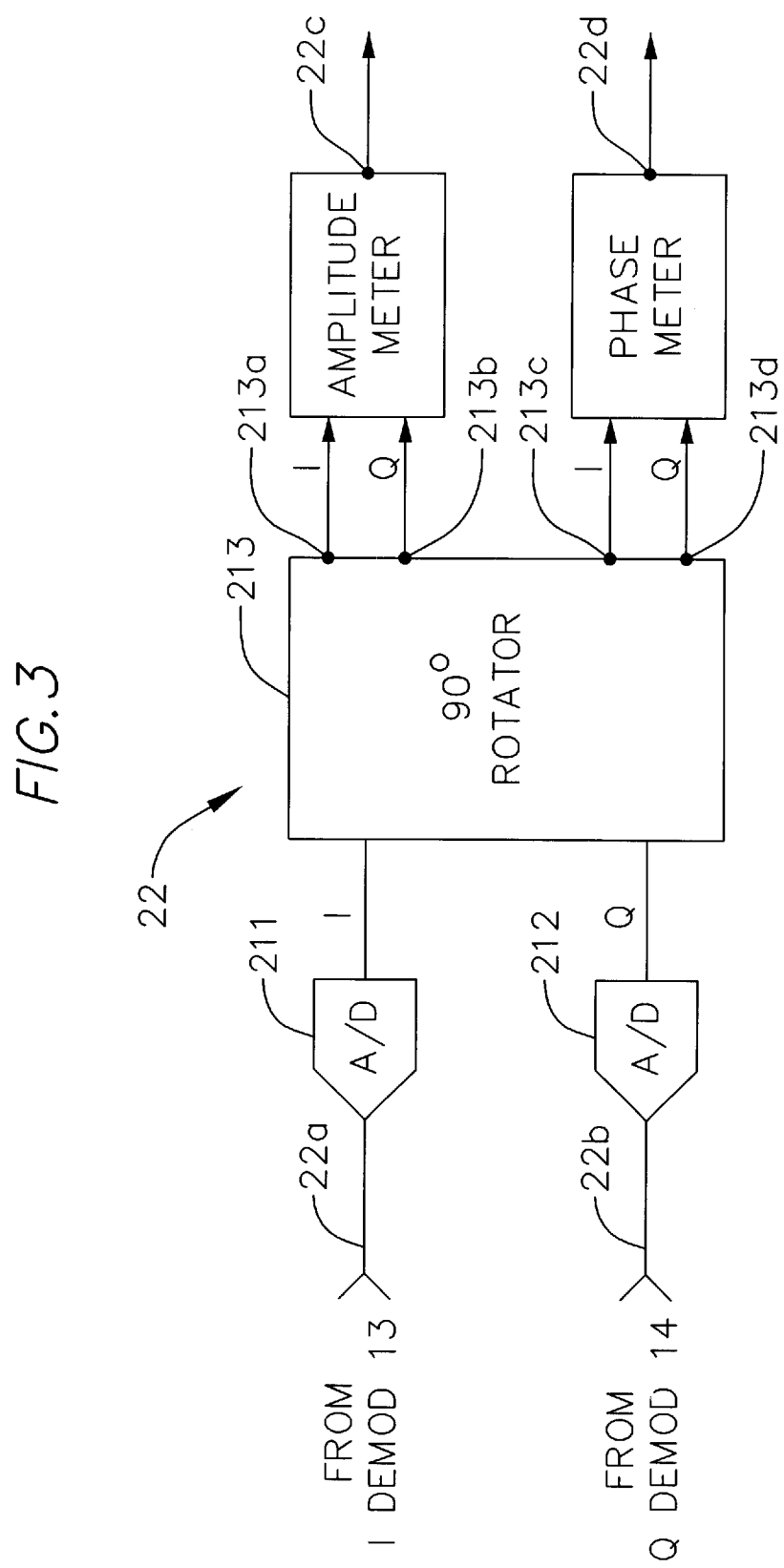
FIG. 3 is a block diagram of an Image/Signal Ration (I/S) Detector used in connection with the subject invention.

With continued reference to FIG. 2, operation of subject invention may be understood to proceed as follows. The demodulated I output from I demodulator 13 is fed into one input of I/S detector 22, and the demodulated Q output of Q demodulator 14 is fed into a second input of the I/S detector. A detailed depiction of the I/S detector is provided in FIG. 3. I/S detector 22 is seen in FIG. 3 to include a pair of A/D converters 211 and 212, respectively, at the input of the I/S detector. In practice, A/D converters 211 and 212 may both be 10-bit converters. However, A/D conversion at the input of the I/S detector is required only in systems that deliver analog outputs at demodulators 13 and 14. In systems that provide digital signals at the demodulator outputs, A/D conversion at the I/S detector input may be eliminated. The outputs of the A/D converters are coupled to the respective I and Q inputs of 90° rotator 213. Rotator 213 imparts an additional 90° phase shift between the I and the Q signals, so that at the output of the rotator, the I and Q signals are 180° out of phase. Rotator 213 provides a first pair of I and Q signals from terminals 213a and 213b to the inputs of amplitude meter 214 and provides a second pair of I and Q output signals from terminals 213c and 213d to the inputs of phase meter 215. The amplitude control output 22c of the I/S detector is applied to an amplitude control input of the quadrature LO generator 21. The phase control output 22d of the I/S detector is applied to the phase control input of quadrature LO generator. As may be anticipated, the amplitude control signal at output 22c is proportional to the relative amplitudes of the demodulated I and Q signals. Similarly, the phase control signal at output 22d is proportional to the phase difference between the demodulated I and Q signals. The amplitude control signal and the phase control signal are measures of the mismatch between the I and Q channels. The manner in which the control signals are synthesized may be acquired with continued reference to FIG. 3.

Simply, operation of I/S detector 22 is predicated on the application of a test tone, at the anticipated RF carrier frequency, to the input of the mixer of the digital receiver, that is, at the node occupied in common by the inputs of the I and Q demodulators. The LO frequency is adjusted first to run at a frequency (RF−IF), and then at a frequency (RF+IF). Consequently, IF signals are generated in a manner that is generally equivalent to the appearance of input signals at both the anticipated RF carrier frequency, and at an image frequency. Viewed alternatively, the variation in LO frequency simulates the appearance of an image signal at the input of the receiver.

The two IF signals, due to desired RF carrier and to image signal, respectively, are time duplexed and appropriately processed into a first signal that is proportional to the amplitude difference between LO_I and LO_Q, and into a second signal that is proportional to the phase difference between LO_I and LO_Q. The theoretical basis for this signal processing follows.

Assume that the RF and image signals are respectively referred to as $V_{RF}$ and $V_{IM}$. Then the down-converted IF signals are $V_{I,RF}$, $V_{Q,RF}$, $V_{I,IM}$, and $V_{Q,IM}$, respectively. After down conversion, and filtering of high-frequency components, the following signals remain:

$$V_{LO}=V_2 \cos(\omega_{LO}t)$$

$$V_{I,RF}=\tfrac{1}{2}V_1V_2 \cos(\omega_{IF}t)$$

$$V_{Q,RF}=-\tfrac{1}{2}V_1V_2 \cos(\omega_{IF}t)$$

$$V_{I,IM}=\tfrac{1}{2}V_1V_2 \cos(\omega_{IF}t)$$

$$V_{Q,IM}=\tfrac{1}{2}V_1V_2 \cos(\omega_{IF}t)$$

Ideally, subtraction of the I and Q components of the RF and IM signals results in the relationships:

$$V_{IF,RF}=V_1V_2 \cos(\omega_{IF}t)$$

$$V_{IF,IM}=0.$$

The results above indicate that if the I and the Q demodulator channels are precisely matched, $V_{IF,IM}=0$. That is, the image signal will be entirely rejected.

However, as suggested above, realizable semiconductor implementations, specifically, CMOS implementations, do not enable precisely matched I and Q channels. Mismatch between the I and Q channels may be modeled mathematically as mismatch between the LO_I and the LO_Q signals 13b and 14b, respectively. Accordingly:

$$V_{LO,I}=V_2 \cos(\omega_{LO}t)$$

$$V_{LO,Q}=(V_2+\Delta V_2)\cos(\omega_{LO}t+\Delta\Phi),$$

where $\Delta V$ and $\Delta\Phi$ represent the amplitude mismatch and the phase mismatch, respectively, of the I and Q channels. As a result an image component will contaminate the down-converted IF signal. The summed signal corresponding to the image response is:

$$V_{S,IM}=-\tfrac{1}{2}V_1 \cos(\omega_{IF}t)\Delta V+\tfrac{1}{2}V_1V_2 \sin(\omega_{IF}t)\Delta\Phi.$$

It is apparent that unwanted image signal consists of two components. The first component is proportional to the amplitude mismatch between the I and Q channels; and the second component is proportional to the phase mismatch. A straightforward mathematical operation, as may be implemented in one of many commercially available DSP integrated circuit devices, may be employed to extract the amplitude error signal and the phase error signal. To wit: $V_{S,IM}$ may be multiplied by $\cos(\omega_{IF}t)$ to extract the amplitude error signal, and by $\sin(\omega_{IF}t)$ to extract the phase error signal.

In operation of the receiver, the amplitude control signal and the phase control signal are synthesized at intervals during which the receiver is not engaged in the reception and processing of information. For example, a Bluetooth receiver, in accordance with the subject invention, calibrates the I and Q channels during the interstitial time periods between reception of data packets. During the dormant interstitial periods, an RF test tone is applied to the input of the mixer section of the receiver, that is, to the inputs of both the I demodulator and the Q demodulator. Concurrently, disparate LO signals are applied in a time-multiplexed mode, to the input of quadrature LO generator. One of the LO signals runs at the frequency appropriate to the RF test tone so as to result in a desired IF output from the demodulators. The second LO signal is frequency offset from the appearance at the receiver input, an image signal. The response of the I and Q channels to the simulated image is then detected as described above. The amplitude control signal and the phase control signal are used to calibrate the I and Q channels against mismatch.

In addition, numerous approaches are available to undertake the signal processing inherent in the subject invention. It is understood that the requisite signal processing may be achieved in hardware, software or a combination of the two. The partitioning of these functions is largely with discretion of the receiver designer. However, inasmuch as the subject invention is intended to be realized, so far as practicable, in monolithic integrated circuit technology, it follows that use of one of the many commercially available digital signal processing (DSP) devices is advantageous. DSP devices and techniques are well known to skilled artisans. See, for example, Ralph Chassaing, *Digital Signal Processing: Laboratory Experiments Using C and the TMS320C31 DSK* (Wiley-Intersorence 1999). If the calibration signals, at both the RF and image, are designed to span the entire dynamic range of the A/D converter, then the achievable image rejection is equivalent to the dynamic range of the A/D converter. For a 10-bit A/D converter, 60 db image rejection is therefore obtainable.

To this point, a technique for developing both an amplitude control signal, proportional to $\Delta V$, and a phase control signal, proportional to $\Delta\Phi$, has been fully explicated. Reiterating, the amplitude control signal appears at output 22c, and the phase control signal at output 22d, of I/S ratio detector 22. As may be seen from FIG. 2, these control signals are applied, respectively, to inputs 21a and 21b of quadrature LO generator 21, in order to control the amplitude and phase differences between LO_I, appearing at output 21d, and LO_Q, appearing at output 21e, of the quadrature LO generator. A preferred implementation of the quadrature LO generator is depicted in FIGS. 4A, 4B and 4C.

Figure 4A:
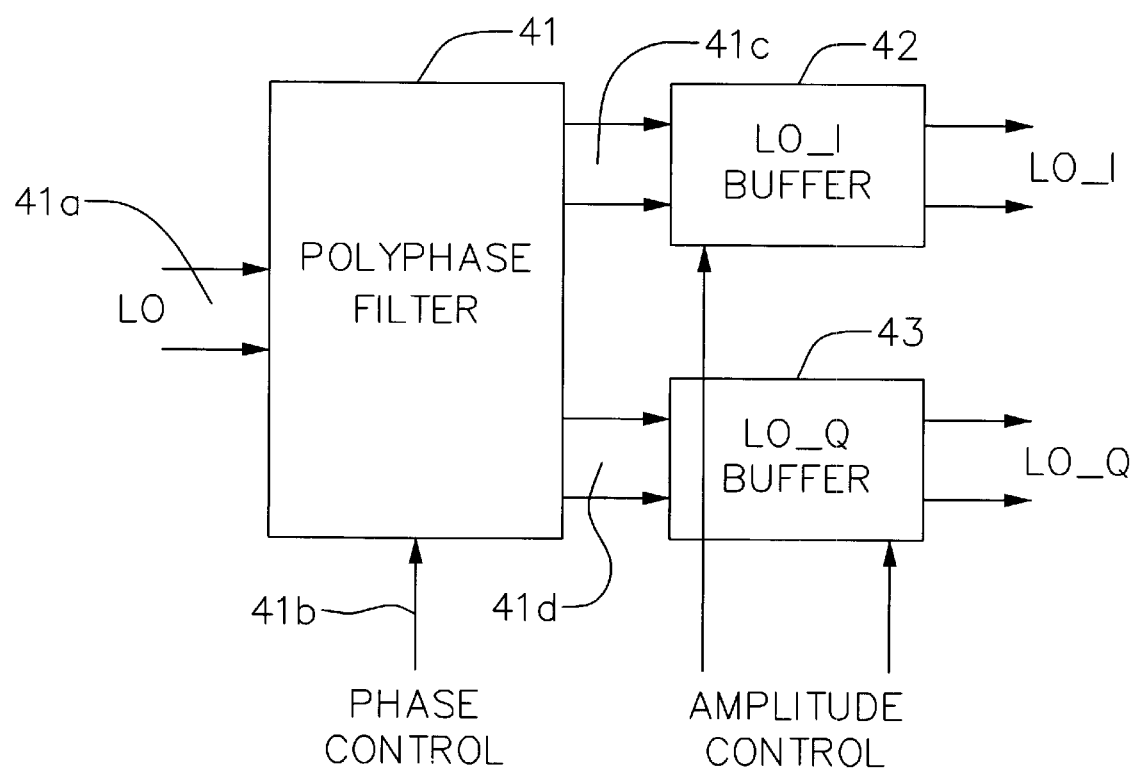
FIG. 4A is a block diagram of the quadrature LO generator depicted in FIG. 2, including a polyphase filter and gain-controlled LO_I and LO_13 Q buffers.

Directing attention first to FIG. 4A, the quadrature LO generator is seen to include a polyphase filter 41 having a balanced (differential) input 41a coupled to the output of the phase-locked local oscillator. The differential input to the polyphase filter consists of an LOP and an LON input. The polyphase filter has a first differential output 41c coupled to LO_I buffer 42 and a second differential output 41d coupled to $LO_{13}$ Q buffer 43. The phase control output of I/S detector 22 is coupled to phase control input 41b of the polyphase filter. The amplitude control output of I/S detector 22 is coupled to amplitude control input 42b of LO_I buffer 42 and to the amplitude control input 43b of LO_Q buffer 43.

Figure 4B:
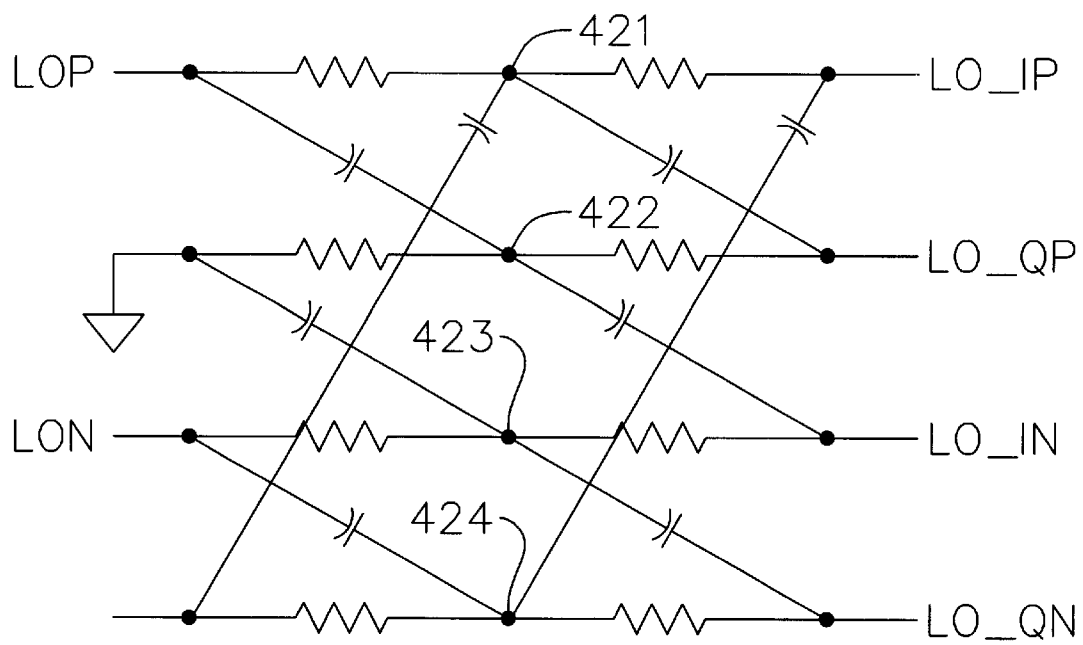
FIG. 4B is a generalized circuit diagram of the polyphase filter.
Figure 4C:
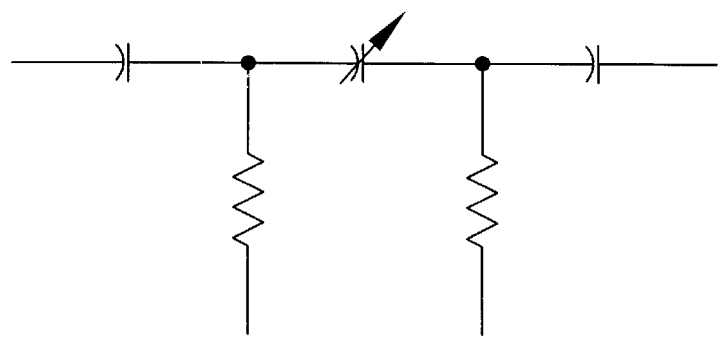
FIG. 4C is a simplified circuit diagram illustrating an example of the manner in which the polyphase filter may be tuned (phase-controlled) with a voltage-variable capacitor.

An exemplary embodiment of the polyphase filter is depicted in FIG. 4B, in which the polyphase filter may be seen to be implemented in the form of an array of tunable capacitors. The array illustrated in FIG. 4B may be defined in terms the set of circuit nodes that consist of input nodes LOP and LON, output nodes LO_IP, LO_QP, LO_IN and LO_QN, internal nodes 421, 422, 423, 424, and a reference node GND. Each of the internal nodes is coupled through an associated capacitance to a respective output node. In addition, node 421 is coupled through a capacitance to node GND, node 422 is coupled through a capacitance to node LOP, node 423 is coupled through a capacitance to node GND, and node 424 is coupled through a capacitance to node LON. Also, each of the internal nodes, 421, 422, 423 and 424, is coupled through an associated resistance to an output node. In addition, node 421 is coupled through a resistance to node LOP, node 422 is coupled through a resistance to node GND, node 423 is coupled through a resistance to node LON, an node 424 is coupled through a resistance to node GND. The values for the resistances and capacitances depicted in the polyphase filter array of FIG. 4B are determined primarily with respect to the operating frequency of the LO signal source and are easily determined by those skilled in the art. FIG. 4C depicts the manner in which a phase control voltage may be applied to a voltage-tunable capacitance, such as a varactor diode, in a manner that will vary the capacitance of the diode.

The output nodes of the polyphase filter are coupled to an LO__I buffer and to an LO__Q buffer that effect amplitude control in response to the amplitude control signal supplied by the I/S detector. Specifically, the differential LO__IP and LO__IN output of the polyphase filter are applied to the differential input of LO__I buffer 42, and the differential LO__QP and LO__QN output of the polyphase filter are coupled to the differential input of LO__Q buffer 43. For the purposes of this Description, the LO__I and LO__Q buffers may be understood to be substantially identical in form. An exemplary embodiment of such a buffer is provided in FIG. 4D.

Figure 4D:
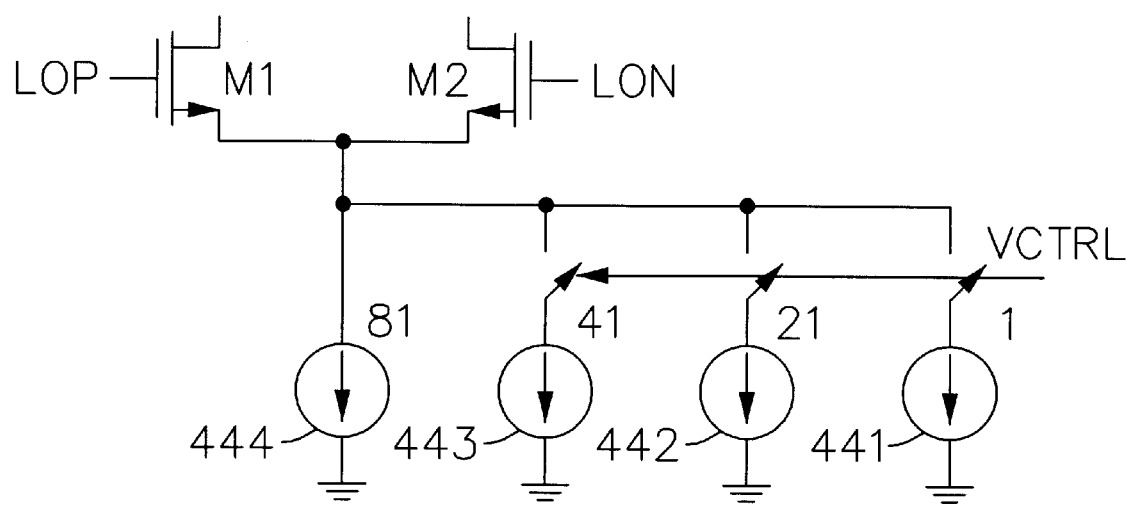
FIG. 4D is a circuit diagram of the buffers depicted in FIG. 4A.

As seen in FIG. 4D, each buffer is constructed around a matched pair of transistors, M1 and M2, arranged in a differential amplifier configuration. In each buffer, the respective differential LO__I or LO__Q input is applied to the input of the differential amplifier, at gate electrodes of M1 and M2. M1 and M2 are MOSFETS configured in a source-coupled mode. Amplitude control of the input LO__I and LO__Q signals is effected by controlling the bias current flowing in M1 and M2. In the arrangement of FIG. 4D a bank of constant-current sources 441, 442, 443 and 444 are coupled in parallel to the common sources of M1 and M2. The respective magnitudes of the currents sourced by sources 441, 442, 443 and 444 are binary weighted, so that the current of source 442 is twice the current of source 441, the current of source 443 is twice the current of source 442, and so forth. As may be expected, the binary amplitude control signal from the amplitude meter of I/S detector 42 operates to selectively render the separate binary-weighted current sources conductive or non-conductive, thereby varying the gain imparted by the differential amplifier to the input LO__I or LO__Q signal. As suggested in FIG. 4D, it is deemed preferable that at least one of the current sources remain continuously conductive so that M1 and M2 are always biased with a nominal quiescent current flow. To this end, current source 444 remains continuously conductive.

Although the subject invention has been described in detail in the context of the exemplary embodiments presented above, the invention, is not to be limited to the described embodiments, but is to be afforded a scope commensurate with the appended Claims, and substantial equivalents thereof. Those having ordinary skill in the art may readily comprehend various additions, modifications and improvements to the described embodiments of the invention, and all such modifications are to be deemed within the scope of the invention.

What is claimed is:

1. A communications receiver comprising:
   a carrier signal source;
   a first demodulator having a first input terminal coupled to an output terminal of the carrier signal source;
   a second demodulator having a first input terminal coupled to an output terminal of the carrier signal source;
   a local oscillator (LO) signal source;
   a quadrature phase shifter having an LO input terminal coupled to the LO signal source, an in-phase (I) output terminal coupled to a second input terminal of the first demodulator, and a quadrature (Q) output terminal coupled to a second input terminal of the second demodulator; and
   an image/signal ratio detector having a first input terminal coupled to an output terminal of the first demodulator, a second input terminal coupled to an output terminal of the second demodulator, and an output terminal coupled to the quadrature phase shifter for adjusting the I output of the phase shifter and the Q output of the phase shifter thereby to adjust the image response of the communications receiver.

2. A communications receiver as defined in claim 1, wherein the image/signal ratio detector is operable to adjust the phase and the amplitude of the I output of the phase shifter and to adjust the phase and the amplitude of the Q output of the phase shifter thereby to reduce the image response of the communications receiver.

3. In a communications receiver having a carrier signal source, a local oscillator (LO) signal source, an in-phase (I) demodulator and a quadrature (Q) demodulator, a feedback loop for controlling the image response of the communications receiver, the feedback loop comprising:
   a quadrature LO generator coupled to provide an LO__I signal (13a) to the I demodulator and an LO__Q signal (14b) to the Q demodulator, wherein the LO__I and LO__Q signals are amplitude-controlled and phase-controlled versions of the LO signal provided by the LO signal source; and
   an image/signal ratio (I/S) detector coupled to detect the amplitude difference and the phase difference between the respective outputs of the I demodulator and the Q demodulator and to adjust the respective relative amplitudes and phases of the LO__I and LO__Q signals in response to the detected amplitude difference and phase difference.

4. A feedback loop for controlling the image response of a communications receiver as defined in claim 3, wherein the quadrature LO generator has an LO input terminal for coupling to the LO signal source, an LO__I output terminal for coupling the LO__I signal to the I demodulator, an LO__Q output terminal coupling the LO$_{13}$ Q signal to the Q demodulator, an amplitude control input terminal and a phase control input terminal and wherein the I/S detector has an I input terminal coupled to the output terminal of the I demodulator, a Q input terminal coupled to the output terminal of the Q demodulator, an amplitude control output terminal coupled to the amplitude control input terminal of the quadrature LO generator for adjusting the relative amplitudes of the LO$_{13}$ I signal and the LO__Q signal, and a phase control output terminal coupled to the phase control input terminal of the quadrature LO generator for adjusting the relative phases of the LO__I signal and the LO__Q signal.

5. A feedback loop for controlling the image response of a communications receiver as defined in claim 4, wherein the relative amplitudes of the LO__I signal and the LO__Q signal and the relative phases of the LO__I signal and the LO$_{13}$ Q signal are adjusted thereby to reduce the image response of the communications receiver.

6. A feedback loop for controlling the image response of a communications receiver as defined in claim 4, wherein the quadrature LO generator comprises:
   a polyphase filter having an LO input terminal coupled to the LO signal source and a phase control input terminal coupled to the phase control output terminal of the I/S detector;
   an LO__I buffer having an LO$_{13}$ I input terminal coupled to an LO__I output terminal of the polyphase filter and an amplitude control input terminal coupled to the amplitude control output terminal of the I/S detector; and an LO_Q buffer having an LO_Q input terminal coupled to an $LO_{13}$ Q output terminal of the polyphase filter and an amplitude control input terminal coupled to the amplitude control output terminal of the I/S detector.

7. A feedback loop for a controlling the image response of a communications receiver as defined in claim 6, wherein the polyphase filter comprises an array of capacitors that are tunable in response to the phase control output of the I/S detector.

8. A feedback loop for controlling the image response of a communications receiver as defined in claim 7, wherein the LO_I buffer and the LO_Q buffer each comprises a differential amplifier having an input terminal coupled to an output terminal of the polyphase filter, and the gain of each of the differential amplifiers is controlled by varying the bias current in the respective differential amplifier in response to the gain control output of the I/S detector.

9. A feedback loop for controlling the image response of a communications receiver as defined in claim 8, wherein the relative amplitude of the LO_I signal and the LO_Q signal and the relative phases of the LO_I signal and the LO_Q signal are adjusted thereby to reduce the image response of the communications receiver.

10. A feedback loop for controlling the image response of a communications receiver as defined in claim 6, wherein the LO_I buffer and the LO_Q buffer each comprises a differential amplifier having an input terminal coupled to an output terminal of the polyphase filter and the gain of each of the differential amplifiers is controlled by varying the bias current in the respective differential amplifier in response to the gain control output of the I/S detector.

11. A feedback loop for controlling the image response of a communications receiver as defined in claim 10, wherein the relative amplitudes of the LO_I signal and the LO_Q signal and the relative phases of the LO_I signal and the LO_Q signal are adjusted thereby to reduce the image response of the communications receiver.

12. A feedback loop for controlling the image response of a communications receiver as defined in claim 4, wherein the I/S detector comprises:

a rotator having an I input terminal coupled to the output terminal of the I demodulator and a Q input terminal coupled to the output terminal of the Q demodulator, a first output terminal, and a second output terminal, the rotator thereby adjusting the relative phase between the output of the I demodulator and the output of the Q demodulator so as to establish a relative phase substantially equal to 180°;

an amplitude meter having an input terminal coupled to the first output terminal of the rotator and providing an amplitude control signal at an output terminal; and a phase meter having an input terminal coupled to the second output terminal of the rotator and providing a phase control signal at an output terminal.

13. A feedback loop for controlling the image response of a communication receiver as defined in claim 12, wherein the I input terminal and the Q input terminal of the rotator means are each coupled to the respective output terminal of the I demodulator and the output terminal of the Q demodulator through a corresponding A/D converter.

14. A feedback loop for controlling the image response of a communications receiver as defined in claim 12, wherein the quadrature LO generator comprises:

a polyphase filter having an LO input terminal coupled to the LO signal source and a phase control input terminal coupled to the phase control output terminal of the I/S detector;

an LO_I buffer having an $LO_{13}$ I input terminal coupled to an LO_I output terminal of the polyphase filter and an amplitude control input terminal coupled to the amplitude control output terminal of the I/S detector; and an $LO_{13}$ Q buffer having an LO_Q input terminal coupled to an LO_Q output terminal of the polyphase filter and an amplitude control input terminal coupled to the amplitude control output terminal of the I/S detector.

15. A feedback loop for a controlling the image response of a communications receiver as defined in claim 14, wherein the polyphase filter comprises an array of capacitors that are tunable in response to the phase control output of the I/S detector.

16. A feedback loop for controlling the image response of a communications receiver as defined in claim 15, wherein the LO_I buffer and the LO_Q buffer each comprises a differential amplifier having an input terminal coupled to an output terminal of the polyphase filter, and the gain of each of the differential amplifiers is controlled by varying the bias current in the respective differential amplifier in response to the gain control output of the I/S detector.

17. A feedback loop for controlling the image response of a communications receiver as defined in claim 16, wherein the relative amplitudes of the LO_I signal and the LO_Q signal and the relative phases of the LO_I signal and the LO_Q signal are adjusted thereby to reduce the image response of the communications receiver.

18. A method for adjusting the image response of a communications receiver that includes in-phase (I) and quadrature (Q) demodulators, the method comprising the acts:

synthesizing an LO signal;

deriving an LO_I signal from the LO signal;

deriving an LO_Q signal from the LO signal;

detecting an amplitude control signal that results from an amplitude mismatch between an I channel and a Q channel of the communications receiver;

detecting a phase control signal that results from a phase mismatch between the I channel and the Q channel;

adjusting the relative amplitudes of the LO_I and the LO_Q signals in response to the amplitude control signal; and adjusting the relative phases of the LO_I and the LO_Q signals in response to the phase control signal, wherein the adjustments to the relative respective amplitudes and the relative respective phases of the LO_I and LO_Q signals operate to compensate for mismatch between the I channel and the Q channel thereby to reduce the image response of the receiver.

19. A method for adjusting the image response of a communications receiver as defined in claim 18, wherein the amplitude control signal is detected by multiplying an image signal, $V_{S,IM}$, by $\cos(\omega_{IF}t)$ and the phase control signal is detected by multiplying $V_{S,IM}$ by $\sin(\omega_{IF}t)$, where $\omega_{IF}$ is the angular intermediate frequency (IF) of the receiver.

20. A method of adjusting the image response of a communications receiver as defined in claim 19, wherein the LO_I and LO_Q signals are derived from the LO signal by a quadrature LO generator, and the amplitude control signal and the phase control signal are detected by an I/S detector.

21. A method for adjusting the image response of a communications receiver as defined in claim 20, wherein the quadrature LO generator comprises:

a polyphase filter having a first input terminal for coupling to the LO signal, a phase control input terminal coupled to the I/S detector, and LO_I output terminal, and an LO_Q output terminal;

a LO_I buffer having an LO_I input terminal coupled to the LO_I output terminal of the polyphase filter and an amplitude control input terminal coupled to the amplitude control output terminal of the I/S detector; and a LO_Q buffer having an LO_Q input terminal coupled to the LO_13 Q output terminal of the polyphase filter and an amplitude control input terminal coupled to the amplitude control output terminal of the I/S detector.

22. A method for adjusting the image response of a communications receiver as defined in claim 18, wherein the amplitude control signal and the phase control signal are detected in an I/S detector that comprises:

a rotator having input terminals coupled to the respective output terminals of the I and the Q demodulators and having first (213a, 213b) and second (213c, 213d) (I,Q) output terminals;

an amplitude meter coupled to the first (I,Q) output terminal of the rotator for detecting the amplitude control signal; and a phase meter coupled to the second (I,Q) output terminal of the rotator for detecting the phase control signal.

23. A method for adjusting the image response of a communications receiver as defined in claim 22, wherein the quadrature LO generator comprises:

a polyphase filter having an input terminal for coupling to the source of LO signals and having an LO_I output terminal and an LO_Q output terminal;

an LO_I buffer having an LO_13 I input terminal coupled to the LO_I output terminal of the polyphase filter and having an LO_I output terminal coupled to the demodulator; and an LO_Q buffer having an LO_Q output terminal of the polyphase filter and having an LO_Q output terminal coupled to the Q demodulator.

24. A mixer for a communications receiver, the mixer comprising:

an I demodulation channel including an I demodulator;

a Q demodulation channel including a Q demodulator;

a quadrature LO generator for coupling to a source of LO signals, the quadrature LO generator for developing an LO_I signal coupled to the I demodulator and an LO_13 Q signal coupled to the Q demodulator, wherein the LO_I and LO_13 Q signals are adjusted in amplitude and phase in response to mismatch between the I and Q channels, wherein the quadrature LO generator comprises:

a polyphase filter having an input terminal for coupling to the source of LO signals, and having an LO_I output terminal and an LO_Q output terminal;

an LO_I buffer having an LO_I input terminal coupled to the LO_I output terminal of the polyphase filter and having an LO_I output terminal coupled to the I demodulator; and an LO_Q buffer having an LO_Q input terminal coupled to the LO_Q output terminal of the polyphase filter and having an LO_Q output terminal coupled to the Q demodulator; and an I/S detector for synthesizing an amplitude control signal and a phase control signal in response to mismatch between the I and the Q channels, the I/S detector having (i) input terminals coupled to output terminals of the I and the Q demodulators, (ii) a first output terminal for applying an amplitude control signal to an amplitude control input terminal of the quadrature LO generator, and (iii) a second output terminal for applying an phase control signal to a phase control input terminal of the quadrature LO generator, the I/S detector comprising:

a rotator having input terminals coupled to the output terminals of the I and the Q demodulators and having first and second I and Q output terminals;

an amplitude meter coupled to the first I and Q output terminal of the rotator for developing the amplitude control signal; and a phase meter coupled to the second I and Q output terminal of the rotator for developing the phase control signal.

25. A mixer for a communications receiver as defined in claim 24, wherein the LO_I and LO_Q signals are adjusted in a manner to reduce the image response of the receiver.

26. A mixer for a communications receiver as defined in claim 25, wherein the I/S detector detects a signal, $V_{S,IM}$, that is representative of the image response of the communications receiver and extracts from $V_{S,IM}$ the amplitude control signal and the phase control signal.

27. A mixer for a communications receiver as defined in claim 26, wherein the amplitude control signal is extracted from $V_{S,IM}$ by multiplying $V_{S,IM}$ by $\cos(\omega_{IF}t)$ and the phase control signal is extracted from $V_{S,IM}$ by multiplying $V_{S,IM}$ by $\sin(\omega_{IF}t)$, where $\omega_{IF}$ is the angular intermediate frequency of the communications receiver.

28. A mixer for a communications receiver as defined in claim 27, wherein the polyphase filter comprises an array of tunable capacitances.

29. A mixer for a communications receiver as defined in claim 28, wherein the array of tunable capacitances comprises capacitances that are voltage-tunable in response to the phase control signal.

30. A mixer for a communications receiver as defined in claim 29, wherein the LO_I buffer and the LO_Q buffer each comprises a differential amplifier that has an input terminal coupled to an output terminal of the polyphase filter and that is gain-controllable in response to a digital amplitude control signal.

31. A mixer for a communications receiver as defined in claim 30, wherein the differential amplifier comprises a pair of source-coupled MOSFETs.

32. A mixer for a communications receiver as defined in claim 30, wherein the LO_I buffer and the LO_Q buffer each comprises a differential amplifier that has an input terminal coupled to an output terminal of the polyphase filter and that is gain-controllable in response to a digital amplitude control signal.

33. In a communications receiver that includes (i) an I demodulation channel including an I demodulator, (ii) a Q demodulator channel including a Q demodulator, and (iii) a quadrature LO generator having an input terminal coupled to a source of LO signals and that provides an LO_I signal to the I demodulator and an LO_Q signal to the Q demodulator, a method of calibrating the receiver to compensate for mismatch between the I and the Q channels, the method comprising the acts:

(a) during an interval during which information is not received by the communications receiver, applying an RF test tone to the input terminals of the I demodulation channel and the Q demodulation channel;

(b) time multiplexing a first LO signal and a second LO signal to the input terminal of the quadrature LO generator so as to simulate the appearance of both a desired RF signal and an image signal at the input terminal of the communications receiver;

(c) detecting a signal, $V_{S,IM}$, resulting from the response of the communications receiver to the simulated image signal;

(d) extracting from $V_{S,IM}$ an amplitude control signal that is proportional to the amplitude mismatch between the I and the Q channels and a phase control signal that is proportional to the phase mismatch between the I and the Q channels; and (e) adjusting the relative amplitudes of the LO_I and the LO_Q signals in response to the amplitude control signal and adjusting the relative phases of the LO_I and the LO_Q signals in response to the phase control signal, wherein the adjustments to the relative respective amplitudes and the relative respective phases of the LO_I and LO_Q signals operate to reduce the image response of the receiver.

34. A method of calibrating a receiver as defined in claim 33, wherein the method is performed during time periods between reception of data packets.

35. A method as defined in claim 34, wherein the quadrature LO generator comprises:

a polyphase filter having an input terminal coupled to a source of LO signals, and having an LO_I output terminal and an LO_Q output terminal;

an LO_I buffer having an LO_I input terminal coupled to the LO_I output terminal of the polyphase filter and having an LO_I output terminal coupled to the I demodulator; and an LO_Q buffer having an LO_Q input terminal coupled to the LO_Q output terminal of the polyphase filter and having an LO_Q output terminal coupled to the Q demodulator.

36. A method as defined in claim 35, wherein the method is performed, in part, by an I/S detector that synthesizes the amplitude control signal and the phase control signal, the I/S detector comprising:

a rotator having input terminals coupled to the output terminals of the I and the Q demodulators and having first and second I and Q output terminals;

an amplitude meter coupled to the first I and Q output terminal of the rotator for developing the amplitude control signal; and a phase meter coupled to the second I and Q output terminal of the rotator for developing the phase control signal.

* * * * *

UNITED STATES PATENT AND TRADEMARK OFFICE
CERTIFICATE OF CORRECTION

PATENT NO. : 6,560,449 B1
DATED : May 6, 2003
INVENTOR(S) : Liu

It is certified that error appears in the above-identified patent and that said Letters Patent is hereby corrected as shown below:

<u>Title page,</u>
Item [56], References Cited, U.S. PATENT DOCUMENTS, insert
-- 4,723,318 A 02/1988 Marshall
   5,469,126 A 11/1995 Murtojarvi
   5,715,529 A 02/1998 Kianush et al.
   5,812,823 A 09/1998 Kahle et al.
   5,926,646 A 07/1999 Pickett et al.
   5,974,306 A 10/1999 Hornak et al.
   6,035,186 A 03/2000 Moore et al.
   6,061,711 A 05/2000 Song et al. --;
Insert -- OTHER PUBLICATIONS, Specification of the Bluetooth System - Core; v1.0B; December 1, 1999; pages 1-1082
   Intel, iAPX 86, 88, 186 and 188 User's Manuel - Programmer's Reference; 1985; Cover Page and Pages 3-1 - 3-6 --.

<u>Column 10,</u>
Lines 41 and 57, delete "$LO_{13}Q$", insert -- $LO\_Q$ --.
Lines 49 and 66, delete "$LO_{13}I$", insert -- $LO\_I$ --.

<u>Column 11,</u>
Line 5, delete "$LO_{13}Q$", insert -- $LO\_Q$ --.
Line 59, delete "communication", insert -- communications --.

<u>Column 12,</u>
Line 1, delete "$LO_{13}I$", insert -- $LO\_I$ --.
Line 6, delete "$LO_{13}Q$", insert -- $LO\_Q$ --.
Line 10, delete "a".

<u>Column 13,</u>
Line 8, delete "$LO_{13}Q$", insert -- $LO\_Q$ --.
Line 30, delete "$LO_{13}I$", insert -- $LO\_I$ --.
Lines 43-45, delete "$LO_{13}Q$ signal coupled to the Q demodulator, wherein the $LO\_I$ and $LO_{13}Q$", insert -- $LO\_Q$ signal coupled to the Q demodulator, wherein the $LO\_I$ and $LO\_Q$ --.

<u>Column 14,</u>
Line 3, delete "an", insert -- a --.

UNITED STATES PATENT AND TRADEMARK OFFICE
CERTIFICATE OF CORRECTION

PATENT NO. : 6,560,449 B1
DATED : May 6, 2003
INVENTOR(S) : Liu

It is certified that error appears in the above-identified patent and that said Letters Patent is hereby corrected as shown below:

Column 15,
Line 10, delete "$LO_{13}Q$", insert -- LO_Q --.

Signed and Sealed this

Thirteenth Day of September, 2005

JON W. DUDAS
*Director of the United States Patent and Trademark Office*